(12) United States Patent
Liu

(10) Patent No.: US 9,573,751 B2
(45) Date of Patent: Feb. 21, 2017

(54) ELECTRONIC CIGARETTE BOX AND ELECTRONIC CIGARETTE

(71) Applicant: KIMREE HI-TECH INC., Tortola (VG)

(72) Inventor: Qiuming Liu, Shenzhen (CN)

(73) Assignee: HUIZHOU KIMREE TECHNOLOGY CO., LTD., SHENZHEN BRANCH, Shenzhen, Guangdong Province (CN)

( * ) Notice: Subject to any disclaimer, the term of this patent is extended or adjusted under 35 U.S.C. 154(b) by 301 days.

(21) Appl. No.: 14/351,562

(22) PCT Filed: Apr. 23, 2013

(86) PCT No.: PCT/CN2013/074570
§ 371 (c)(1),
(2) Date: Apr. 12, 2014

(87) PCT Pub. No.: WO2014/172845
PCT Pub. Date: Oct. 30, 2014

(65) Prior Publication Data
US 2016/0137399 A1 May 19, 2016

(51) Int. Cl.
*B65D 85/00* (2006.01)
*A24F 15/18* (2006.01)
(Continued)

(52) U.S. Cl.
CPC .............. *B65D 85/70* (2013.01); *A24F 15/18* (2013.01); *A24F 47/008* (2013.01); *H02J 7/007* (2013.01); *H02J 7/0042* (2013.01); *H02J 7/0068* (2013.01)

(58) Field of Classification Search
CPC ..... B65D 85/70; B65D 81/113; A24F 47/008; H02J 7/007; H02J 7/0042; G06F 1/1628; A45C 2013/025; A45C 13/02
(Continued)

(56) References Cited

U.S. PATENT DOCUMENTS

| 3,885,576 A | 5/1975 | Symmes |
| 3,963,033 A | 6/1976 | Pope |

(Continued)

FOREIGN PATENT DOCUMENTS

| CN | 2151434 Y | 12/1993 |
| CN | 1206899 A | 2/1999 |

(Continued)

*Primary Examiner* — Jacob K Ackun
(74) *Attorney, Agent, or Firm* — Cheng-Ju Chiang

(57) ABSTRACT

The present invention provides an electronic cigarette and an electronic cigarette box thereof. The electronic cigarette box includes a box body, a battery, a control module, a battery pole charging module for charging a battery, a battery charging module for charging the battery, and an electric shock module. The box body has an accommodating chamber. The battery is disposed inside the accommodating chamber. The control module is connected with a rechargeable battery. The battery charging module, the battery pole charging module and the electric shock module are all connected to the control module, the electric shock module has a control switch. The high-voltage electric shock module can release high voltage for self-defense. User can control turn-on or turn-off of the high-voltage electric shock module by the controlling the switch.

10 Claims, 2 Drawing Sheets

(51) Int. Cl.
*A24F 47/00* (2006.01)
*H02J 7/00* (2006.01)

(58) Field of Classification Search
USPC .................................. 206/242, 320, 576, 701
See application file for complete search history.

(56) References Cited

U.S. PATENT DOCUMENTS

| | | |
|---|---|---|
| 2012/0227753 A1 | 9/2012 | Newton |
| 2014/0007892 A1* | 1/2014 | Liu ................. G08C 23/02 131/329 |
| 2014/0123989 A1* | 5/2014 | LaMothe ............ A24F 47/008 131/328 |
| 2015/0102777 A1* | 4/2015 | Cooper ................ H02J 7/0042 320/114 |
| 2015/0215439 A1* | 7/2015 | Stanimirovic ........ H04M 1/215 455/572 |
| 2015/0237918 A1* | 8/2015 | Liu ..................... A24F 47/008 131/328 |

FOREIGN PATENT DOCUMENTS

| | | |
|---|---|---|
| CN | 201550602 U | 8/2010 |
| CN | 201813848 U | 5/2011 |

\* cited by examiner

ELECTRONIC CIGARETTE BOX AND ELECTRONIC CIGARETTE

CROSS REFERENCE TO RELATED APPLICATIONS

The present application is a 35 U.S.C. §371 National Phase conversion of International (PCT) Patent Application No. PCT/CN2013/074570, filed on Apr. 23, 2013, the disclosure of which is incorporated by reference herein. The PCT International Patent Application was filed in Chinese.

FIELD OF THE INVENTION

The present invention relates to an electronic cigarette, in particularly, to the box structure of an electronic cigarette.

BACKGROUND OF THE INVENTION

Cigarettes, as a hobby good, are widely appreciated by people, especially men. However, the tar in cigarettes is harmful to human health, most of which are carcinogens, and secondary smoking cause great harm on non-smokers, so most public places have banned smoking But for smokers, quitting smoking is a very difficult thing, so a lot of cigarettes alternatives such as electronic cigarettes in place of cigarettes came into the market.

Electronic cigarettes, also known as virtual cigarettes, or electronic atomizers, are mainly used for smoking cessation and alternatives cigarettes. It has the same appearance as the cigarettes and taste similar to cigarettes, and can suck out the smoke, suck out the taste with feeling, but it has no other harmful components such as tar in cigarettes, aerosols and so on.

Conventional electronic cigarette has battery inside, which charge a battery pole, so that the electronic cigarette can be used repeatedly. However, the electronic cigarette only has simulation cigarettes and charging function, the function is single.

SUMMARY OF THE INVENTION

The problem of the present invention to be solved is to provide to provide an electronic cigarette and electronic cigarette box, which can provide a shock-defense capabilities.

To achieve the above-mentioned object, the present invention provides an electronic cigarette box including a box body defining an accommodating chamber, a battery disposed inside the accommodating chamber, a control module connected with a rechargeable battery, a battery pole charging module for charging a battery pole, a battery charging module for charging the battery, and an electric shock module. The battery charging module, the battery pole charging module and the electric shock module are all connected to the control module, the electric shock module has a control switch.

In a further embodiment, the electric shock module includes at least one shock head, the shock head connects to the battery and extends to the outside of the box body.

In a further embodiment, the control switch is exposed to an outer surface of the box body.

In a further embodiment, the battery pole charging module includes a charging elastic sheet for the touch with the battery pole, the charging elastic sheet connects with the battery.

In a further embodiment, the box body includes a lower shell and an upper cover, the lower shell and the upper cover are detachably flipped.

In a further embodiment, the box body includes a lower shell and an upper cover, the upper cover covers on the lower shell and hinges with the lower shall by a rotary shaft.

In a further embodiment, the box body is rectangular, circular or polygonal.

In a further embodiment, he box body is a plastic box or a metal box.

The present invention further provides an electronic cigarette includes an electronic cigarette box, at least one atomizer and at least one atomizer battery pole disposed inside the box. The battery pole connected to the battery pole charging module.

The advantage of the present invention is: the box body of the electronic cigarette box has the battery and the control module disposed therein. The battery pole charging module connecting with the control module is used for charging the battery pole. The battery charging module is used for charging the battery. The electric shock module can release high-voltage shock for self-defense, while the shock module has the control switch, the user can control the high-voltage electric shock module by the controlling the switch.

Embodiments of the present invention will be further described in detail in the following drawings.

DETAILED DESCRIPTION OF THE INVENTION

Figure 1:
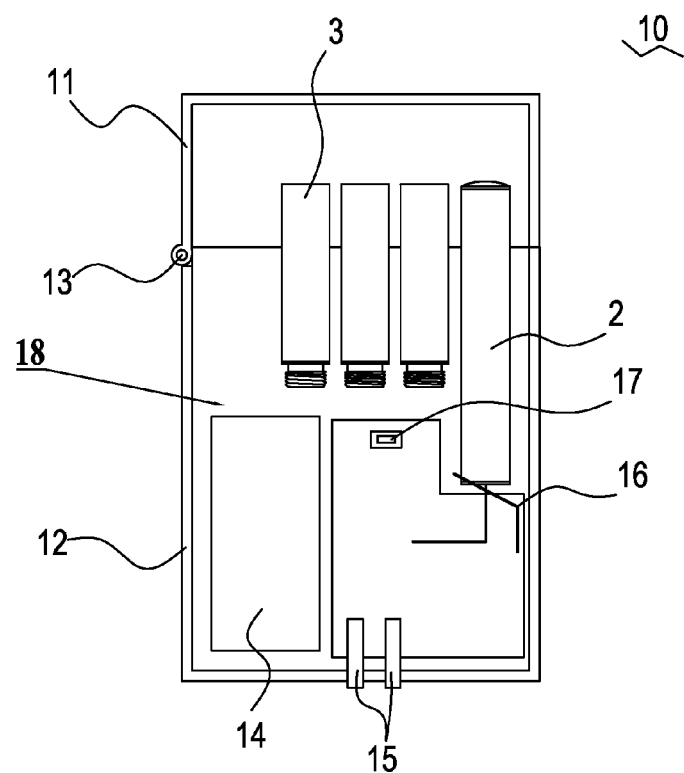
FIG. 1 is a schematic view of an electronic cigarette of an embodiment of the present invention.
Figure 2:
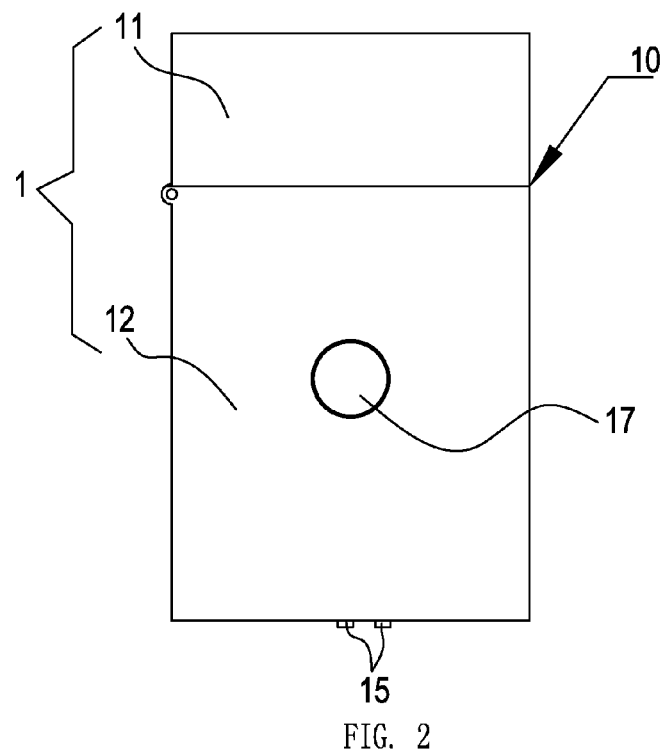
FIG. 2 is a schematic view of the external structure of the electronic cigarette shown in FIG. 1.
Figure 3:
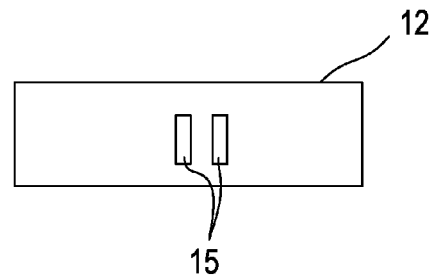
FIG. 3 is a schematic view of the external structure of the high-voltage electric shock head on the electronic cigarette shown in FIG. 1.

Referring to the FIGS. 1-3, a first embodiment of the present invention is provided with an electronic cigarette box 10, an atomizer 3 of an electronic cigarette is disposed inside the electronic cigarette box 10, and a battery pole 2 of the electronic cigarette is disposed inside the electronic cigarette box 10 too. The atomizer 3 and the battery pole 2 are able to be detachably assembled to the electronic cigarette. One or more atomizers 3 are disposed inside the electronic cigarette box 10 to facilitate replacement. The battery pole 2 has a rechargeable battery (not shown). The battery pole 2 can be charged by the battery inside the electronic cigarette box 10 to achieve repeated use of the electronic cigarette.

The electronic cigarette box 10 includes a box body 1 which has an accommodating chamber 18. Referring to the FIGS. 1 and 2, in the embodiment, the box body 1 includes an upper cover 11 and a lower shell 12. The upper cover 11 covers on the lower shell 12 and hinges with the lower shell 12 by a rotary shaft 13. Therefore, flipping the upper cover 11 can make the upper cover 11 to cover the lower shell 12 or open the accommodating chamber 18 of the box body 1.

Of course, in other embodiments, the upper cover 11 and the lower shell 12 can be designed as detachable flip structure, such as to use snap structure to make the upper cover 11 and the lower shell 12 detachably fixed.

Figure 4:
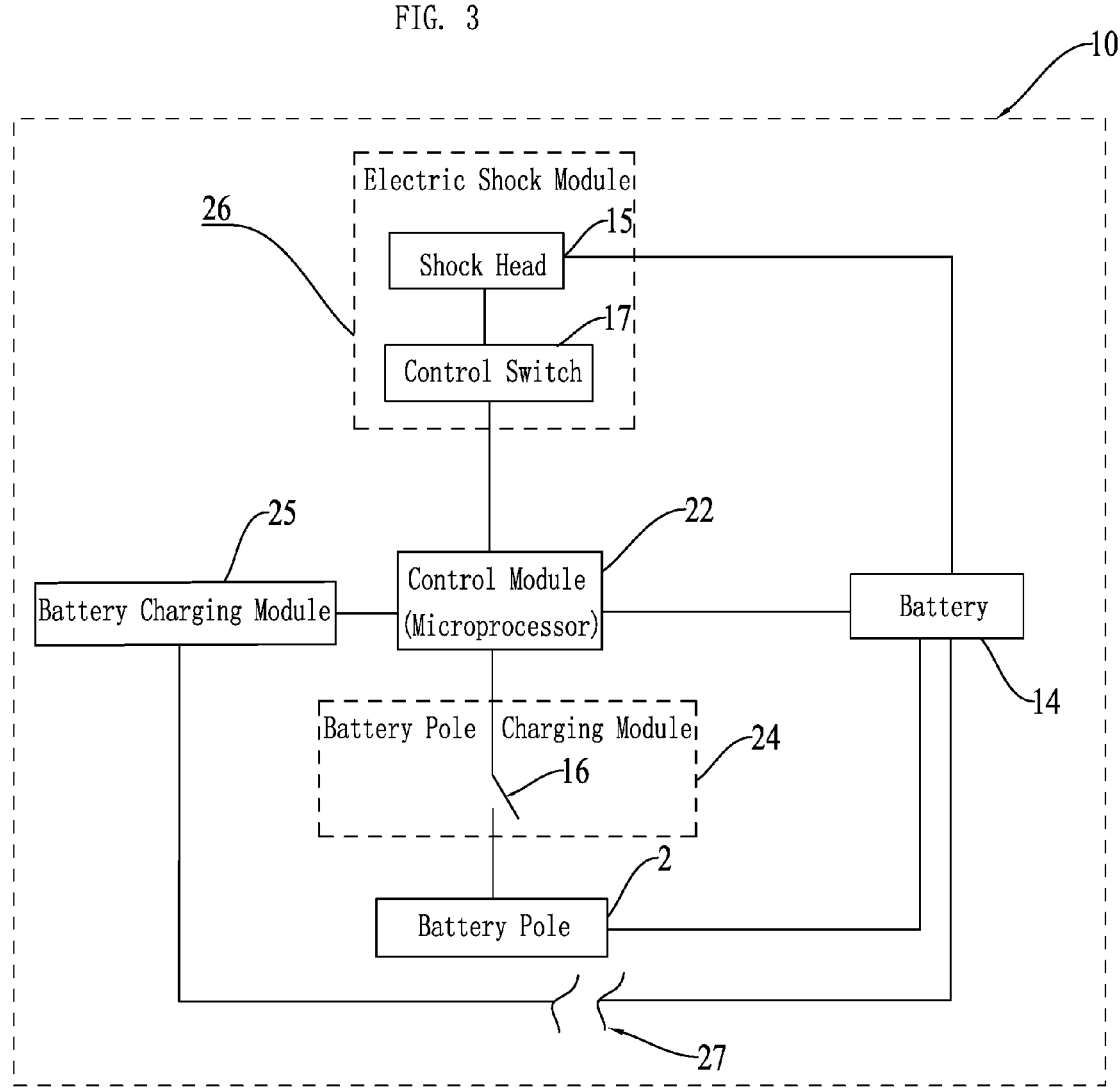
FIG. 4 is an electronic schematic of an electronic cigarette box of the present invention.

In the first embodiment, a battery 14 is disposed in the accommodation chamber 18 of the box body 1, and the box 10 also includes a control module (Microprocessor) 22, a battery pole charging module 24, a battery charging module 25 and an electric shock module 26. Referring to FIG. 4, the control module 22 electrically connects with the rechargeable battery 14, and the battery charging module 25, the battery pole charging module 24 and the electric shock module 26 are all electrically connected with the control module 22.

Specifically, the battery pole charging module 24 is used for charging the rechargeable battery of the battery pole 2. In the first embodiment, the battery pole charging module 24 includes a charging elastic sheet 16 for contacting with the battery pole 2. The charging elastic sheet 16 directly contact with a charging part of the battery pole 2 and is controlled by the control module 22.

Specifically, the battery charging module 25 can use an external power 27 to charge the battery 14, then the battery 14 can charge the rechargeable battery of the battery pole 2 or provide power for other functions of the electronic cigarette.

Specifically, the shock module 26 corresponds to set a control switch 17. The shock module 26 is a high-voltage electric shock module. User can control the high-voltage electric shock module 26 to release high voltage (range from 200V to 10,000V) instantaneously by controlling the control switch 17 so that the electronic cigarette box 10 has a high-voltage electric shock function.

Specifically, the electric shock module 26 has at least one shock head 15, and the shock head 15 is connected to the battery 14 and extends to the outside of the box body to facilitate to use electric shock.

In a further embodiment, to facilitate user to control, the control switch 17 may be exposed on the outer surface of the box body.

In a further embodiment, in this embodiment the box body may be square, of course, in other embodiment the box body can have more choices such as circular, polygonal and so on.

In a further embodiment, the box may be plastic box or metal box.

In this embodiment, the battery pole charging module 24 in the electronic cigarette box 10 is used for charging the rechargeable battery of the battery pole 2. The battery charging module 25 is used for charging the battery 14, and the high-voltage electric shock module 26 can release high voltage for self-defense. Meanwhile, the high-voltage electric shock module 26 corresponds to set the control switch 17, and the user can control turn-on or turn-off of the high-voltage electric shock module 26 by the controlling the control switch 17.

Embodiments of the present invention is shown and described in the above-mentioned. Various improvement and modifications can be made to the embodiments by those skilled in the art without departing from the true spirit and scope of the disclosure. The scope of the present invention is defined by the appended claims and equivalents thereof.

What is claimed is:

1. An electronic cigarette box, comprising:
   a box body defining an accommodating chamber;
   a battery disposed inside the accommodating chamber;
   a control module electrically connected with the battery;
   a battery pole charging module for charging a battery pole of an electronic cigarette by the battery under a control of the control module;
   a battery charging module for charging the battery by an external power under a control of the control module; and
   an electric shock module;
   wherein the battery charging module, the battery pole charging module and the electric shock module are all electrically connected to the control module, the electric shock module has a control switch;
   the battery charging module controls the battery and the battery is electrically connected with the external power;
   the battery pole charging module controls the battery pole of the electronic cigarette and the battery pole is electrically connected with the battery; and
   the electric shock module controls a high-voltage electric shock function of the electronic cigarette box.

2. According to the electronic cigarette box in claim 1, wherein the electric shock module includes at least one shock head, the shock head is electrically connected with the battery and extends to the outside of the box body; the shock module is a high-voltage electric shock module; the high-voltage electric shock module is able to release a high voltage instantaneously by controlling the control switch whereby the electronic cigarette box has the high-voltage electric shock function.

3. According to the electronic cigarette box in claim 2, wherein the control switch is exposed to an outer surface of the box body; the high voltage is in a range from 200V to 10,000V.

4. According to the electronic cigarette box in claim 3, wherein the battery pole charging module includes a charging elastic sheet for electrically touching with the battery pole, the charging elastic sheet is electrically connected with the battery.

5. According to the electronic cigarette box in claim 4, wherein the box body includes a lower shell and an upper cover, the upper cover covers on the lower shell and hinges with the lower shell by a rotary shaft.

6. According to the electronic cigarette box in claim 1, wherein the box body is a plastic box or a metal box.

7. An electronic cigarette box, comprising:
   a box body defining an accommodating chamber;
   a battery disposed inside the accommodating chamber;
   a control module electrically connected with the battery;
   a battery charging module for charging the battery; and
   an electric shock module;
   wherein the battery charging module, and the electric shock module are all electrically connected to the control module, the electric shock module has a control switch.

8. According to the electronic cigarette box in claim 7, wherein the electric shock module includes at least one shock head, the shock head is electrically connected with the battery and extends to the outside of the box body.

9. According to the electronic cigarette box in claim 8, wherein the control switch is exposed to an outer surface of the box body.

10. According to the electronic cigarette box in claim 7, wherein the electronic cigarette box further comprising a battery pole charging module for charging a battery pole, the battery pole charging module includes a charging elastic sheet electrically touching with the battery pole, the charging elastic sheet is electrically connected with the battery.

\* \* \* \* \*